Figure 1:
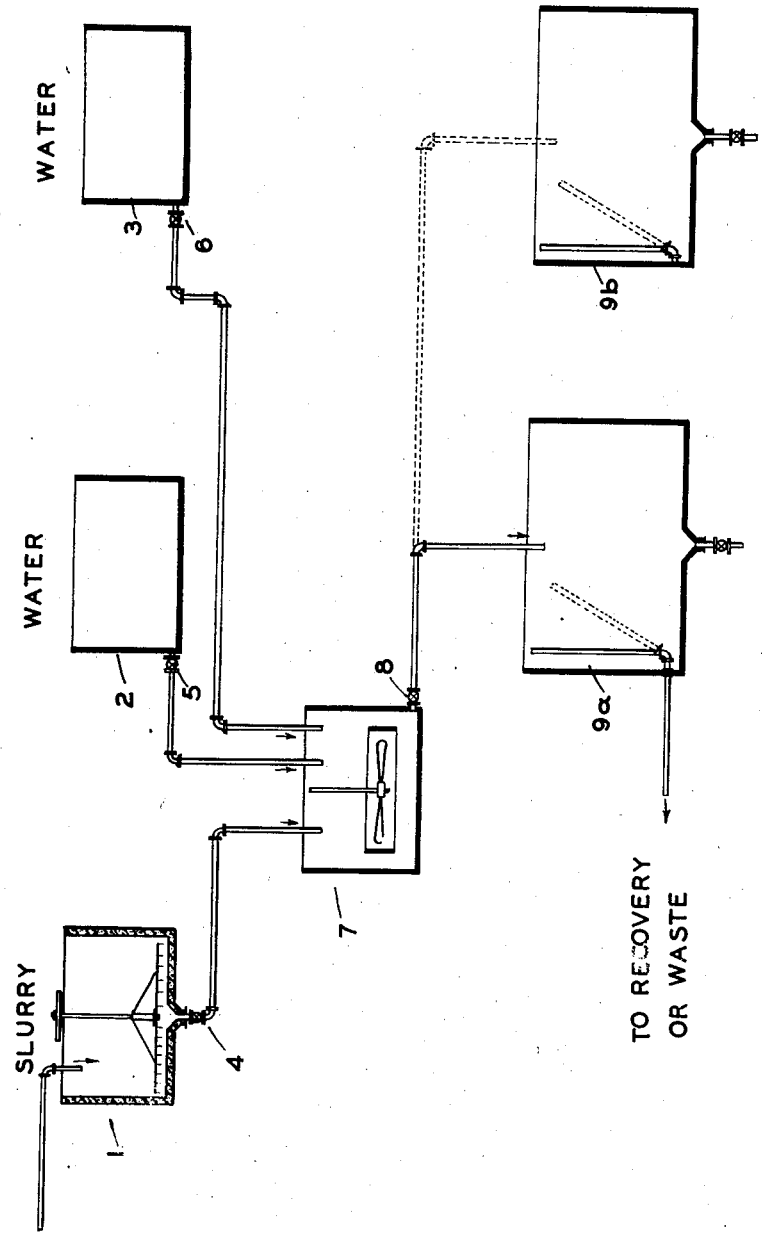

June 6, 1939.  E. J. ROBERTS  2,161,652
MANUFACTURE OF BARIUM SULPHATE
Filed Dec. 27, 1934  2 Sheets-Sheet 1

INVENTOR.
ELLIOTT J. ROBERTS
BY
Arthur Middleton
ATTORNEY.

June 6, 1939. E. J. ROBERTS 2,161,652
MANUFACTURE OF BARIUM SULPHATE
Filed Dec. 27, 1934 2 Sheets-Sheet 2

INVENTOR.
ELLIOTT J. ROBERTS
BY
ATTORNEY.

Patented June 6, 1939

2,161,652

UNITED STATES PATENT OFFICE 2,161,652

MANUFACTURE OF BARIUM SULPHATE

Elliott J. Roberts, Westport, Conn.

Application December 27, 1934, Serial No. 759,375

4 Claims. (Cl. 23—122)

This invention relates to the production of finely divided precipitated barium sulphate suitable for use as a pigment or extender to be employed in the manufacture of paints, paper, printing inks, etc. More particularly it pertains to the precipitation of barium sulphate particles of a predetermined size from a slurry comprising an aqueous solution of sulphuric acid in concentrated form and a solid-phase product, essentially a compound of $BaSO_4$ and $H_2SO_4$, said slurry or paste being such as is produced in the process set forth in United States application for patent, Serial No. 620,974 by Work and Alessandroni.

More particularly still it pertains to such precipitation from such a slurry or paste through the addition of water thereto as essentially illustrated in the following equation:

Further, it pertains to the precipitation from such a slurry of a product having an optimum opacity or turbidity.

In the above-mentioned patent application the recommended procedure, in general, calls for subjecting crude ground barytes to the action of a concentrated solution of sulphuric acid, the concentration of the same varying in accordance with the temperature at which the reaction is effected. Preferably the reaction is carried out through the use of approximately ¾ to 1½ parts of acid to one of barytes at a temperature of approximately 50° C. and the acid having a concentration in excess of 93%. The result of the reaction is that the barite (essentially $BaSO_4$) is converted into a solid compound of $H_2SO_4$ and $BaSO_4$ or, in other words, there is formed a slurry composed of solid barium acid sulphate suspended in the sulphuric acid solution. Upon completion of this reaction, water is added to the slurry to dilute the solution of $H_2SO_4$, which results in the decomposition of the solid barium acid sulphate and its conversion to solid $BaSO_4$ in finely-divided particle form suitable for pigment use.

I have discovered that a product having the desired particle size can be secured with greater ease and accuracy by a modification of the older method.

The novelty of the method lies in the fact that the solid acid sulphate compound is decomposed in one concentration of $H_2SO_4$, the product digested therein for a certain period of time whereupon the solution is diluted to a lower concentration of $H_2SO_4$ and the solid $BaSO_4$ separated from this solution. It is seen therefore that the method which I have discovered comprises essentially three steps that may be termed (1) a conversion-precipitation step (2) a particle-enlarging step and (3) a particle-growth arresting step, which steps may be used in various combinations and which steps and combinations may be described as follows:

For the production of a precipitate having essentially a maximum of obscuring power or opacity I prefer to start with a slurry comprising an aqueous solution of sulphuric acid in concentrated form and solid phase compound or compounds essentially $BaSO_4.H_2SO_4$ in which slurry the ratio of barium sulphate as such to $H_2SO_4$, both combined (as in $BaSO_4.H_2SO_4$) and uncombined, is approximately 1:2 by weight. Ratios within the range of 1:1 and 1:4 may be employed without essentially changing the method. To such a slurry water or dilute $H_2SO_4$ is added and mixed thoroughly therewith in an amount sufficient to dilute the $H_2SO_4$ present in the solution phase of the slurry together with that liberated as precipitation of $BaSO_4$ proceeds so that, when the conversion and precipitation are completed, the aqueous solution of sulphuric acid in the reaction product slurry (see Equation I) will contain essentially 70% $H_2SO_4$. For best results the concentration of sulphuric acid in this resulting aqueous solution should be within the limits 60% and 75%.

One possible picture of the mechanism or mode of the conversion and precipitation reaction is as follows: At a given temperature, say 90° C., there is a certain definite concentration of $H_2SO_4$ at which $BaSO_4$ and the acid sulphate compound (probably $BaSO_4.H_2SO_4$) can exist side by side without any tendency for one to change into the other. At any lower concentration of $H_2SO_4$, the acid sulphate compound is more soluble than crystalline $BaSO_4$, and therefore $BaSO_4$ tends to precipitate or crystallize out while the acid sulphate compound tends to dissolve. There is a certain range of concentrations, just below the equilibrium concentration, wherein the tendency for $BaSO_4$ to precipitate is not strong enough to cause new crystallization centers or nuclei to form, but below this range, new nuclei of $BaSO_4$ will form, and, other things being equal, the lower the concentration, the greater the rate of formation of nuclei. The reason for this is that the lower the concentration of $H_2SO_4$, the greater is the ratio of the solubility of the acid sulphate to the normal sulphate ($BaSO_4$). In the solution the full ratio probably never is attained because the acid sulphate compound does not dissolve fast enough to maintain its full solubility. Nevertheless the trend with changing concentration is towards larger numbers of nuclei with lower concentrations of $H_2SO_4$.

Thus at the higher concentrations of $H_2SO_4$, fewer nuclei can form before all of the acid sulphate compound completely dissolves, and a coarser precipitate results.

To obtain best results in the light of my present knowledge, the addition of the required amount of water should be effected under conditions of mixing adequate to avoid, if possible, or minimize localized over-dilution and under-dilution of the solution in the slurry. Such a result may be attained by flowing the slurry and water at properly proportioned rates simultaneously into a tank equipped with an adequate agitating device. This may be done batch-wise, i. e., starting with an empty tank and filling it with the two ingredients flowing in simultaneously, or it may be done in a continuous manner i. e. by starting with an empty tank into which the ingredients are flowing simultaneously thus filling it to a point of overflow from which the mixture goes to subsequent operations as the ingredients continue to flow in.

As has been previously explained the particle size is theoretically dependent on the $H_2SO_4$ concentration of the resultant solution. Thus localized over-dilution, which tends to decrease this concentration in the localized zone, tends to produce particles of smaller size than those desired and further localized under-dilution tends, oppositely, to produce particles of sizes larger than desired. It will be understood that, although the presence of the solid phase compounds, essentially $BaSO_4.H_2SO_4$, in the slurry being diluted tends to lessen the effect of temporary over-dilution through the retarding effect due to its rate of dissolution, it is desirable to produce a homogeneously uniform solution phase with a minimum of the objectionable conditions.

The mixing of the water and the slurry having been completed the precipitation approaches completion insofar as the condensation of $BaSO_4$ from the solution phase is concerned in a relatively short duration of time. However, improved opacity of precipitate is attained by prolonging the contact between the slurry ingredients (now essentially solid $BaSO_4$ suspended in an aqueous solution of essentially 70% $H_2SO_4$) for a length of time up to several hours. Depending on the size and shape of the original acid sulphate crystals, the precipitate will continue to grow and increase in obscuring power for from 30 minutes to 6 hours.

Theoretically, the mechanism or mode of the reaction which proceeds during this extended time of contact may be explained as follows: When all of the initial slurry solid-phase component (essentially $BaSO_4.H_2SO_4$) has been dissolved and the condensation of $BaSO_4$ from the solution phase to form solid precipitated $BaSO_4$ has been completed, the sizes of the precipitated particles are essentially all less than that range of sizes required for optimum opacity. It is known that $BaSO_4$ is somewhat soluble in aqueous solutions of sulphuric acid of the concentrations above specified. It is also known that under otherwise identical conditions small particles are more soluble than large crystals of the same substance. Hence under conditions of contact above described the small crystals of $BaSO_4$ are dissolved and the molecules are redeposited upon the larger ones to the end that the smaller ones tend to disappear and the larger ones tend to grow larger so that the sizes of those resulting ultimately lie within that range of sizes which constitutes particles having a maximum opacity. The solubility of the $BaSO_4$ in the $H_2SO_4$ solutions decrease rapidly with decreasing percentage $H_2SO_4$ in the range of concentrations in question so that in 70% $H_2SO_4$ the solubility may be 100 or more times what it is in 50% $H_2SO_4$. The higher the solubility, the faster the solution and deposition can take place which explains why the coarsening process proceeds so much more rapidly in 70% acid than in 50% acid.

From the foregoing it will be understood that if particles be desired of sizes smaller than that required for optimum opacity, such particle sizes may be attained by adding larger amounts of water (so as to produce a concentration of less than 60% sulphuric acid in the aqueous solution component of the resulting slurry) and/or lessening the time of contact between the components of the reaction-product slurry (comprising precipitated $BaSO_4$ and an aqueous solution of sulphuric acid as above specified). Conversely if particles be desired of sizes larger than that required for optimum opacity, such particle sizes may be attained by adding lesser amounts of water (up to substantially 80% $H_2SO_4$) and/or extending said time of contact.

When the desired size of particle has been attained as above described additional water is added to the reaction product slurry for the purpose of substantially arresting the crystal growth at the desired point. With the preferred method of precipitation above described I prefer an amount of said additional water sufficient to reduce the concentration of $H_2SO_4$ in the solution component of the slurry to essentially 50%. Such an amount does not yield as complete an arrest as would larger amounts yielding lower concentrations but said larger amounts are objectionable from an economic viewpoint in that it is desirable to recover $H_2SO_4$ in concentrated form by evaporation of water for re-use in the step of producing the initial slurry described above and comprising essentially a solid phase product essentially $BaSO_4.H_2SO_4$ and an aqueous solution of sulphuric acid in concentrated form.

The growth of the crystals having been to a large degree arrested the reaction product slurry may be separated into its components, the precipitate, essentially $BaSO_4$, having a desired particle size and an aqueous solution of sulphuric acid, by suitable means such as sedimentation and/or filtration.

From the foregoing it will be understood that although the growth of crystals is largely arrested in the preferred method when the acid component of the reaction product slurry is diluted to a concentration of essentially 50% thru the last named addition of water, prolonged contact of the slurry components after said arresting operation may result in some further crystal growth. Such contact may arise, for example, in the employment of sedimentation as a means for separating the slurry components. The effect of such contact may, obviously, be offset by reducing the time of contact between the components of that reaction product slurry above described as comprising essentially solid $BaSO_4$ suspended in an aqueous solution of 70% $H_2SO_4$ so as to compensate for crystal growth which occurs subsequent to the arrest. The effect of such contact may also, obviously, be offset by adding larger amounts of water in the initial $BaSO_4$ precipitation step so as to produce for example a slurry comprising essentially solid BaSO₄ suspended in an aqueous solution of, say, 60% (instead of 70% above specified) H₂SO₄.

I have found that temperatures, while influencing results obtained to some extent, are relatively of less importance than the factors of concentration and time. However, I prefer to employ in the initial step a slurry (comprising the (BaSO₄.H₂SO₄ solid and an aqueous solution of sulphuric acid in concentrated form) having a temperature of essentially 50° C. and water (for addition to said initial slurry) having a temperature of essentially 20° C. Due to the heat evolved during mixing these ingredients the temperature of the reaction product slurry will be above 90° C. which temperature (above 90° C.) may best be maintained during the contact or crystal-enlarging step. The preferred temperature of water to be used in what may be called the arresting step is likewise essentially 20° C. or lower. In general, other factors being the same, higher temperatures tend to produce larger particle sizes.

It will be understood, since the diluting effect of the reagent water comprises the cause of the precipitation of the pigment in my process, that aqueous solutions of sulphuric acid of concentrations and in amounts sufficient to produce the desired reaction product solution may be substituted as a reagent for the reagent water employed in the foregoing specification.

The same procedure as that described above for barium sulphate may also be applied to the production of other alkaline earth sulphates, that is, calcium and strontium sulphates. The compound of the selected sulphate with sulphuric acid is treated with a limited amount of water, which amount is so chosen that it will decompose the compound and precipitate the sulphate but will not be so dilute as to substantially arrest the growth of the resultant sulphate particles. After digesting the particles in this solution until the desired crystal growth has been attained, the solution is diluted still further until the particle growth has been largely arrested whereupon the sulphate particles may be separated from the solution.

Figure 2:
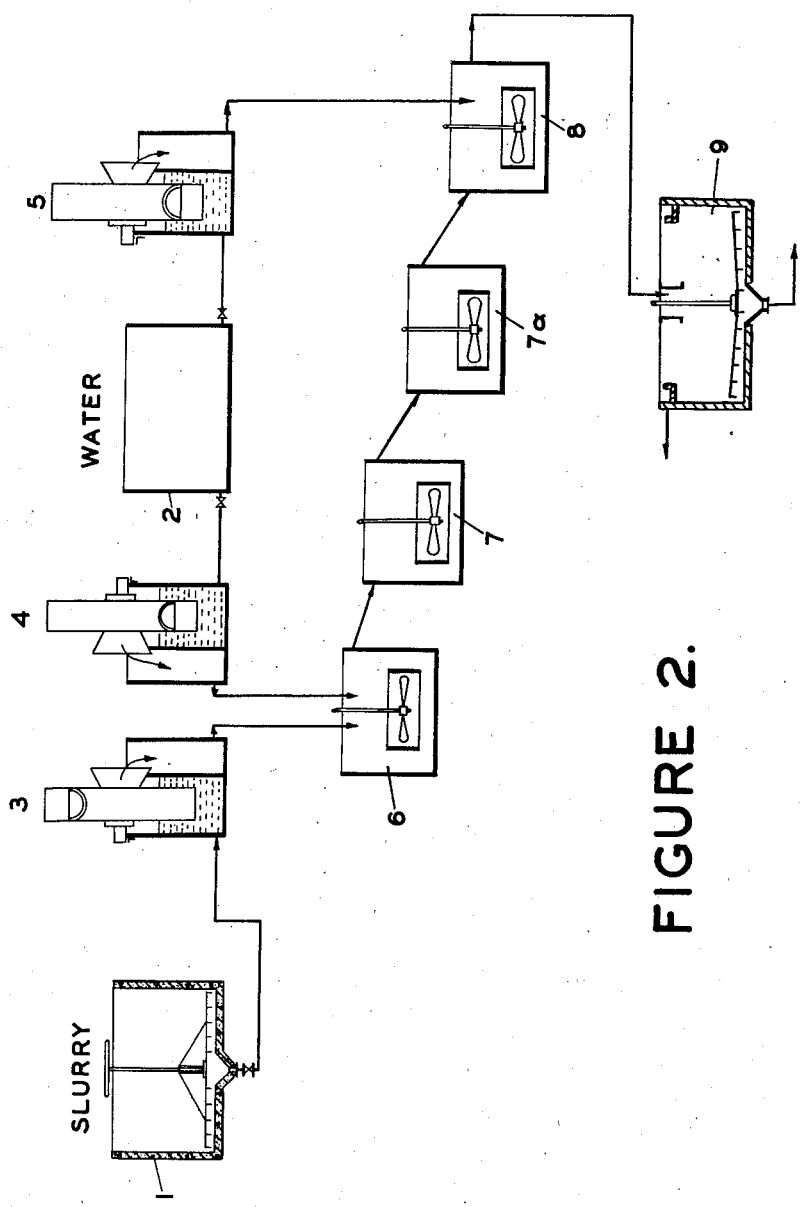

Preferable methods of using my invention may be further illustrated as in Figs. 1 and 2.

Fig. 1 illustrates diagrammatically its application in a batchwise manner. Initial slurry comprising essentially solid BaSO₄.H₂SO₄ and an aqueous solution of sulphuric acid of high concentration and having the desired temperature is drawn in measured quantity into tank 1. Water, of the desired temperature, is drawn into tank 2 in an amount as required to effect conversion and precipitation and produce the reaction product slurry. Additional water, in measured quantity to effect the arrest of particle growth is drawn into tank 3. Valves 4 and 5 are then opened so as to permit the contents of tanks 1 and 2 to flow simultaneously, and at rates which will essentially empty said tanks 1 and 2 in the same time (say two or three minutes) into tank 7 which is equipped with an agitating device providing adequate mixing. The contents of tank 7, having a temperature preferably in excess of 90° C., are held in a state of relative uniform suspension for a period suitable in duration to effect particle growth to the desired size and then valve 6 is opened to introduce into tank 7 the contents of tank 3 so as to arrest further crystal growth. The contents of tank 7 are now discharged via valve 8 to tank 9A (or 9B) in which the separation of the solid matter from the solution may be effected by sedimentation methods.

Fig. 2 illustrates diagrammatically the application of this invention in a continuous manner. A supply of the initial slurry at the desired temperature is stored in tank 1 and a supply of suitable water is stored in tank 2. Slurry is continuously drawn from tank 1 at a desired rate thru a measuring device 3 while water is likewise, and in the rate desired to correspond with the slurry rate, drawn from tank 2 thru the measuring device 4 and both are introduced simultaneously into tank 6 where mixing of slurry and water is attained in an adequate manner and wherein precipitation and conversion are started. Tank 6 having been filled to a point of overflow continuously discharges to tanks 7 and 7A operating in series via overflows, and each equipped with means for providing agitation adequate to maintain a uniform suspension, wherein conversion and precipitation are completed and crystal growth is effected to attain a desired particle size. The overflow from tank 7A is introduced into tank 8, equipped with means for providing suitable agitation adequate for maintaining a uniform suspension, into which tank 8 is also introduced, from tank 2, via a measuring device 5, an amount of water as required to essentially arrest crystal growth, said tank 8 having been filled to a point of overflow continuously discharging to tank 9, essentially a continuous settling tank, and the first of a series of such tanks operating in a countercurrent decantation manner, in which series the solid precipitate is separated from the accompanying solution.

A convenient method for determining the obscuring power or opacity of the produced BaSO₄ is as follows: The product is washed thoroughly, filtered and dried at 110° C. One tenth of a gram is weighed out into a small agate mortar and rubbed to a smooth paste in 1–2 drops of thick glycerine. This operation disperses the more loosely bound aggregates. Four drops of 1% gum arabic solution are then added and the mixture stirred and rubbed until well mixed. One milliliter of the gum arabic solution is added and the whole washed into a 250 ml. graduated flask and made up to the mark with distilled water. After shaking to insure thorough mixing, the suspension is poured into a turbidimeter tube of the Jackson type until the image of the light source disappears. A 15 watt clear electric light bulb serves for a light source. The depth of the suspension in the tube in centimeters is read and the reading applied in the formula:

$$\text{Obscuring power} = \frac{\text{dilution of sample in milliliters per gm.}}{\text{cm. depth of suspension}}$$

The depth of the suspension should lie in the range 5–15 cm. for maximum accuracy. If less than 5 cm., a further dilution of the sample is made, say to 500 cc. or 1000 cc. and another reading taken. If greater than 15 cm., another sample may be made up to 100 cc. but such an obscuring power would be very low.

For example 0.1 gm. diluted to 500 ml. gave a reading of 8.0 cm. According to the above equation the obscuring power of this sample is 5000/8.0 = 625 cm²/gm.

I claim:

1. In a process for making precipitated barium sulphate from a slurry or paste consisting essentially of an aqueous solution of sulphuric acid of high concentration and solid phase compound of $BaSO_4$ and $H_2SO_4$, the steps of mixing with said slurry, an aqueous diluent in an amount such that after the decomposition of the acid sulphate crystals is complete, the solution contains from 60 to 75% $H_2SO_4$, of maintaining the resultant slurry in a state of suspension for a period of time up to six hours until the desired particle size is obtained; and of mixing at the end of this period additional aqueous diluent with said slurry in an amount such that the solution contains less than 55% and more than 30% $H_2SO_4$.

2. The method as in claim 1 wherein the final slurry is separated into its components comprising precipitated $BaSO_4$ and an aqueous solution of essentially sulphuric acid.

3. In a process for making precipitated barium sulphate from a slurry or paste consisting essentially of an aqueous solution of sulphuric acid of high concentration and solid phase compound of $BaSO_4$ and $H_2SO_4$, the steps of mixing with said slurry, an aqueous diluent in an amount such that after the decomposition of the acid sulphate crystals is complete, the solution contains from 60 to 75% $H_2SO_4$, of maintaining the resultant slurry in a state of suspension for a period of time up to one hour until the desired particle size is obtained; and of mixing at the end of this period additional aqueous diluent with said slurry in an amount such that the solution contains less than 55% and more than 30% $H_2SO_4$.

4. The method as in claim 3 wherein the final slurry is separated into its components comprising precipitated $BaSO_4$ and an aqueous solution of essentially sulphuric acid.

ELLIOTT J. ROBERTS.